United States Patent [19]

Samuels et al.

[11] Patent Number: 4,524,114
[45] Date of Patent: Jun. 18, 1985

[54] BIFUNCTIONAL AIR ELECTRODE

[75] Inventors: George J. Samuels, Syracuse; Thomas A. Schmitkons, Camillus; Terry L. Streeter, Liverpool, all of N.Y.; Royce W. Murray, Chapel Hill, N.C.

[73] Assignee: Allied Corporation, Morris Township, Morris County, N.J.

[21] Appl. No.: 510,489

[22] Filed: Jul. 5, 1983

[51] Int. Cl.³ .............................................. H01M 4/86
[52] U.S. Cl. .................................... 429/42; 429/40; 429/44; 204/290 R; 204/294
[58] Field of Search .................. 429/40, 41, 42, 43, 429/44, 27–29; 204/290 R, 294

[56] References Cited

U.S. PATENT DOCUMENTS

| | | | |
|---|---|---|---|
| 4,138,411 | 2/1979 | Gandihon | 260/340.5 R |
| 4,146,458 | 3/1979 | Horowitz et al. | 429/40 |
| 4,293,310 | 10/1981 | Weber | 422/68 |
| 4,341,848 | 7/1982 | Liu et al. | 429/42 |
| 4,430,391 | 2/1984 | Ovshinsky et al. | 429/40 |
| 4,439,302 | 3/1984 | Wrighton et al. | 204/290 R |
| 4,461,691 | 7/1984 | Frank | 204/242 |
| 4,476,003 | 10/1984 | Frank et al. | 204/290 R |

OTHER PUBLICATIONS

L. R. Faulkner, C & EN, Feb. 27, 1984, pp. 28–44.
O. Haas et al., Electrochimica Acta, vol. 27, pp. 991–994 (1982).
H. Abruña et al., J. Am. Chem. Soc., vol. 103, pp. 1–5 (1981).
P. G. Pickup et al., J. Am. Chem. Soc., vol. 105, pp. 4510–4514 (1983).
J. S. Facci et al., J. Am. Chem. Soc., vol. 104, pp. 4959–4960 (1982).
P. G. Pickup et al., J. Am. Chem. Soc., vol. 106, pp. 1991–1998 (1984).
P. G. Pickup et al., J. Electrochem. Soc., vol. 131, pp. 833–839 (1984).

Primary Examiner—Aaron Weisstuch
Attorney, Agent, or Firm—Richard C. Stewart, II

[57] ABSTRACT

Novel catalytic electrode in which the oxidation catalyst is protected from unfavorable redox potentials by an insulation/rectification matrix composed of a polymeric matrix containing an insulating and rectifying effective amount of a dispersed redox conductor.

17 Claims, 1 Drawing Figure

BIFUNCTIONAL AIR ELECTRODE

BACKGROUND OF THE INVENTION

1. Field of the Invention

This invention relates to a novel catalytic electrode in which the oxidation catalyst is protected from unfavorable redox potentials by an insulation/rectification matrix. Another aspect of this invention relates to a method of protecting electroactive materials from unfavorable redox potentials through use of such matrix.

2. Prior Art

Many substances, while stable at certain voltages, are extremely unstable at other voltages. Thus, these materials are extremely susceptible to swings in voltages. This problem is especially acute in bifunctional air electrodes which experience tremendous voltage swings in operating between the discharge and charge modes. For example, when operating in the charge mode, oxidation catalysts on the surface of bifunctional electrodes are relatively stable, however, when voltages are reversed and the electrode functions in a discharge mode, these catalysts are subject to reductive decomposition.

Air electrodes were first investigated at the turn of the century for use in fuel cells. More recently they have found application in metal/air batteries, such as zinc/air for railroad signalling and remote communications systems, aluminum/air and iron/air batteries for vehicular propulsion, and in fuel cells for utility power generation. Miniaturization has allowed entry by air electrodes into the hearing aid market. An air electrode operates on the reduction of oxygen to water as described by the reaction:

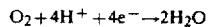

$$O_2 + 4H^+ + 4e^- \rightarrow 2H_2O$$

Several advantages are attendant to the use of air electrodes in batteries. For example, batteries which contain air electrodes have very attractive energy densities relative to most other kinds of batteries because they utilize oxygen from the surrounding air as one electrode reactant. This results in a reduction in space and weight requirements normally associated with batteries in which cathode active materials must be stored within the battery. Consequently, battery systems which contain air electrodes can be compact and lightweight. In addition, use of oxygen from the air obviates present severe engineering and environmental problems encountered in advanced batteries based on molten sulfur, chlorine, bromine, and other corrosive cathode materials. With the incorporation of a bifunctional air electrode into a battery, there is no need for high temperatures, complex electrolyte systems and in the case of halogens, relatively complex plumbing and storage of the cathode material. The high energy density of air electrode batteries is of greatest advantage in applications which also require reversibility. Combination of these two characteristics in a single battery is of particular advantage in mobile systems that have weight and power restrictions. A bifunctional air electrode incorporated in a battery can operate both as a cathode, reducing oxygen to water for energy production; and as an anode, oxidizing water for energy storage. This reduces the overall weight while providing an environmentally safe power source in that only water and oxygen are produced.

Attempts to produce a commercially acceptable bifunctional air electrode have met with limited success due to a number of difficulties. One such difficulty is an inability to find a catalyst which functions well in both cathodic and anodic directions and which has sufficient survivability to the severe environmental conditions to which it is repeatedly subjected during cycling. One solution to this difficulty is to use a third electrode for recharging the battery. However, this solution results in other difficulties foremost of which is that it results in a complex and bulky system thus negating one of the desirable features of air electrodes.

SUMMARY OF THE INVENTION

In accordance with this invention, there is provided an electronic device of the type which includes a material which is susceptible to decomposition when subjected to fluctuations in redox potential, said device comprising a redox matrix positioned between said material and a source of redox potential, said redox matrix comprising a polymeric matrix containing an "insulating/rectifying effective amount" of one or more "redox conductors" dispersed within said matrix which allow charge transport through said matrix at selected potentials. In a more preferred aspect, this invention relates to an improved bifunctional electrode of the type having finely divided catalytic particles fixed to the surface thereof, the improvement comprising a redox matrix positioned between said particles and a source of redox potential, said matrix including an "insulating and rectifying effective amount" of one or more "redox conductors" dispersed therein said matrix allowing current flow to and from said catalytic particles at selected potentials determined by the redox potential of said redox conductors and the Nernst equation.

The invention revolves around the principle that certain chemical species will be oxidized or reduced at a specified potential dependent on the concentration of the species and its standard electrode potential which specified potential may be calculated through use of the Nernst Equation. A further principle is that oxidation and reduction are essentially charge transport and in most cases are reversible. Briefly stated, the system functions as follows: At the appropriate potential, the redox conductors in the matrix are converted to their higher oxidation state. The conductors are now poised to accept electrons from some source which, in the case of a bifunctional catalytic electrode, would be the catalyst particles. The electrons are accepted by the redox conductors adjacent to the source of electrons. Charge or electrons are then transported through the matrix by hopping from one redox conductor site to another site. Unless the conductor sites are part of the matrix, for example part of a polymer backbone, they are free to move through the matrix like ions in an ion exchange membrane carrying the charge with them. This additional mechanism of charge transport does not obviate the protective nature of the matrix since the redox conductors can only transmit and receive charge at discrete potentials. The dynamics for the electron transfer/hopping phenomenon is provided by the removal of electrons at the matrix surface or interface opposite the surface or interface adjacent the source of electrons. There is no change in the chemical identity of the redox conductor, only in its oxidation state. The conductivity and charge transport of the matrix is dependent on the rate of exchange of electrons hopping between each conductor site and the mobility of conductor sites. The movement of electrons by hopping from one discrete redox conductor site to another in the matrix or transport by a conductor site is different from the classical conduction band (flow) model. It is this hopping/site carrier mechanism that uniquely defines redox charge transport. This difference in the mechanism of charge transport allows the redox matrix to function as a switch controlling the direction of charge flow.

Rectification is accomplished by the redox matrix because it can only relay charge when there is a mixture of oxidation states present providing sites for the electron to hop to. Thus the potential range where electron conduction can occur is defined by the redox potential of the redox conductor dispersed in the matrix and the Nernst equation. At all other potentials where there is only one oxidation state present, the matrix functions as an insulator and prevents electron flow. It is this property, the ability to act as an insulator except at discrete potential ranges, that protects the susceptible material from fluctuations in voltage potential.

BRIEF DESCRIPTION OF THE DRAWING

For a more complete understanding of the invention, reference is made to the following description taken in conjunction with the drawing in which.

DESCRIPTION OF THE PREFERRED EMBODIMENTS

Figure 1:
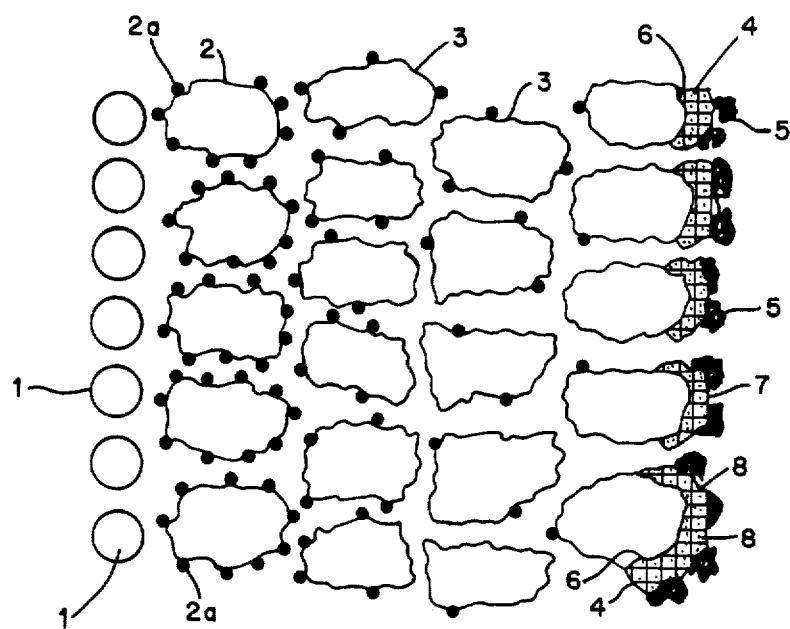
FIG. 1 is a schematic of a bifunctional air electrode incorporating the redox matrix of this invention.

The mechanism of charge transport and the phenomena of redox insulation and rectification by the matrix of this invention is described in reference to a bifunctional electrode, a schematic of which is set forth in FIG. 1. The bifunctional air electrode depicted in FIG. 1 can be considered a structure consisting of five domains. At the air side of the electrode is a hydrophobic gas permeable layer 1 which is constructed of a material such as a sintered microporous fluorocarbon polymer sheet as for example, a polytetrafluoroethylene, polychlorotrifluoroethylene, polyvinylidenefluoride, ethylene/chlorotrifluoroethylene copolymer, poly($\alpha,\beta,\beta$-trifluorostyrene), polypropylenehexafluoride and polyethylenetrifluoride. Useful fluorocarbon can be obtained from commercial sources, as for example from Allied Corporation under the trademark Halar®, or from Dupont Co. under the trademark Teflon®. Layer 1 functions to prevent electrolyte from migrating out of the cell while still allowing the efficient transport of oxygen to the second layer 2. Layer 2 consists of micro-dispersed reduction catalyst 2(a) such as platinum based electrocatalysts dispersed on various conductive, high surface area carbon substrates bound with a fluorocarbon powder such as polytetrafluoroethylene, polypropylenehexafluoride, a polychlorotrifluoroethylene and the like. Attached to layer 2 is layer 3 which functions as the bulk support for the electrode. Layer 3 can be composed of such conventional conductive materials as reticulated vitreous carbon, sintered activated carbon, carbon felt, carbonized paper and the like. Depending upon electrode size, these conductive materials may or may not need an additional inert structure support or current collector to effectively distribute charge over the electrode.

Layer 4 of the electrode is the redox matrix of this invention which physically isolates the oxidation catalyst of layer 5 from the electrode surface 6 and sources of redox potential. Redox matrix 4 is composed of a polymeric substrate 7 either composed of an "insulating and rectifying effective amount" of one or more redox conductor, or in which an insulating and rectifying effective amount of one or more redox conductor 8 has been dispersed. As used herein a "redox conductor" is any material which can be either oxidized or reduced at some specific voltage potential but is inert to oxidation and reduction at other potentials. Thus, essentially any material can be used as redox conductors in the practice of the process of this invention depending on the specific potential at which electron flow or conduction and electrical insulation is desired. In the preferred embodiments of this invention, a metal, in either the salt or chelate form, is used as the redox conductor with the restriction that these metal compounds are substantially substitutionally inert in both oxidation states. This restriction introduces certain demands upon the materials employed as redox conductors in the preferred embodiments of the electrode of this invention, especially if they are metals of the first row of the Periodic Table i.e., compounds of chromium, iron and cobalt. Redox conductors composed of these first row metals should be complexes of bidentate chelates of chelating agents such as bipyridine, phenanthroline, 5-methylphenanthroline, 5-chlorophenanthroline, 5-nitrophenanthroline, 5-amino phenanthroline, 3,4,7,8-tetramethylphenanthroline, 4,7-dimethyl phenanthroline, 4-methylphenanthroline, 4-vinyl phenanthroline, 4,7-divinylphenanthroline, 5,5'bipyrimidine, 5,5'bipyrazine, 4,4'dimethylbipyridine, 4,4'diphenylbipyridine, other 4,4'disubstituted bipyridines, and like chelating agents, the foregoing restriction is less important for metals of the second and third rows of the Periodic Table. In general, redox conductors employed in this invention should exhibit a high self exchange rate for redox processes which results in a rapid electron transfer or hopping between redox conductor sites. Molecules which have this characteristic have small inner and outer sphere reorganizational barriers to electron transfer as described by the Marcus Theory. The self exchange rate constant for suitable redox conductors is usually at least about $20M^{-1}S^{-1}$. In the preferred embodiments of the invention, the self exchange rate constant is at least about $10^3 M^{-1}S^{-1}$, and in the particular preferred embodiments is at least about $10^6 M^{-1}S^{-1}$. Amongst these particularly preferred embodiments most preferred are those embodiments in which the self exchange rate constant of the redox conductor is at least about $10^9 M^{-1}S^{-1}$. Illustrative of such useful redox conductors having suitable self exchange rate constants are trisbipyridyl derivatives of iron, ruthenium and osmium, and various compounds of iridium. Also illustrative of such redox conductors are the following compounds in which "bpy" is bipyridyl, "acac" is acetylacetonate, "im" is imidizole, "py" is pyridine, "pym" is pyrimidine, and "pyr" is pyrazine;

$[Ru(bpy)_2(acac)]^{2+/+}$
$[Ru(bpy)_2(CN)_2]^{+/0}$
$[Ru(bpy)_2(im)_2]^{3+/2+}$
$[Ru(bpy)_2(4,4'-bpy)(py)]^{3+/2+}$
$[Ru(bpy)_3]^{3+/2+}$
$[Ru(bpy)_2(py)_2]^{3+/2+}$
$[Ru(bpy)_2(4,4'-bpy)_2]^{3+/2+}$
$[Ru(bpy)_2(py)(CH_3CN)]^{3+/2+}$
$[Ru(bpy)_2(pym)_2]^{3+/2+}$
$[Ru(bpy)_2(CH_3CN)_2]^{3+/2+}$
$[Ru(bpy)_2(pyr)_2]^{3+/2+}$
$[Ru(bpy)_2((p-CH_3-C_6H_4)_3P)_2]^{3+/2+}$
$[Ru(bpy)_2(CH_3(C_6H_5)_2P)_{21}]^{3+/2+}$
$[Ru(bpy)_2(NCC_6H_5)_2]^{3+/2+}$
$[Ru(bpy)_2(NCCH=CH_2)_2]^{3+/2+}$
$[Ru(bpy)_2(((C_6H_5)_2P)_2C_4H_8)]^{3+/2+}$ $[Ru(bpy)_2(((C_6H_5)_2P)_2—CH_2)]^{3+/2+}$
$[Ru(bpy)_2(((C_6H_5)_2P)_2—C_3H_6)]^{3+/2+}$
$[Ru(bpy)_2(((C_6H_5)_2P)_2—C_2H_2)]^{3+/2+}$ Also useful as redox conductors in the practice of this invention are $[RuL_3]$, $[FeL_3]$ and $[OsL_3]$ complexes of the following ligands in which "phen" is phenanthroline, "Me" is methyl, and "bpy" is as defined above.

3,4,7,8-Me$_4$phen
4,7-Me$_2$phen
5,5'-Me$_2$bpy
5-Mephen
phen
bpy
5-Clphen
4-NO$_2$bpy
5-NH$_2$phen
5-NO$_2$phen
4,4'-Cl$_2$bpy
5,5'-bipyrimidine
1,2-bis(diphenylphosphino)ethylene It should be noted that the ligands around the metal do not need to be identical though this allows for easier preparation of the redox conductor. By combining different ligands one is able to fine tune the charge carrying potential of the redox conductor.

The polymeric substrate 7 employed in the construction of the redox matrix of this invention is not critical in the practice of the present invention and can be composed of conventional polymeric materials known to those of skill in the art. For example, substrate 7 can be constructed of said polymer electrolyte membranes described in U.S. Pat. No. 4,171,253 and U.S. Pat. No. 3,134,697. Useful solid polymer electrolyte membranes or sheets can be made with cationic or anionic ion exchange resin membranes, and the resins include in their polymeric structure ionizable radicals, one ionic component of which is fixed or retained by the polymeric matrix with at least one ion component being a mobile replaceable ion electrostatically associated with the fixed component. The ability of the mobile ion to be replaced under appropriate conditions with other ions imparts ion exchange characteristics to these materials. Useful ion exchange resins include those which can be prepared by polymerizing a mixture of polymerizable monomer, one of which monomers may be a polymerizable transition metal complex, i.e., $Ru(bpy)-(4,4'-divinylbpy)^{2+}$. Two broad classes of useful ion exchange resins are the so-called sulfonic acid cation exchange resins and carboxylic cation exchange resins. In the sulfonic acid cation exchange resins, the cation ion exchange groups are hydrated sulfonic acid radicals which are attached to the polymer backbone by sulfonation. In the carboxylic cation exchange resins, the ion exchange group is a carboxyl group which is attached to the polymer backbone. The sulfonic acid and carboxylic acid The ion exchange resins may also be in various salt forms such as the sodium salt and the potassium salt.

In the case of useful anion exchange resins, the ionic group is basic in nature and may comprise amine groups, quaternary ammonium hydroxides, the guanidine group, and other nitrogen-containing basic groups. In both cases, that is, those where the ionic groups are acidic groups or in those cases where the ionic groups are basic, the ionizable group is attached to a polymeric compound, typical examples of which are a phenol-formaldehyde resin, a polystyrene-divinylbenzene copolymer, a ureaformaldehyde resin, a malamine-formuladehyde resin, and the like.

The formation of these useful ion exchange resins into membranes or sheets is also well known in the art, and they are generally known as the heterogeneous type in which granules of ion exchange resin are incorporated into a sheet-like matrix of suitable binder, for example, a binder of polyethylene or polyvinyl chloride, and the continuous or homogeneous ion exchange resin membrane in which the entire membrane structure has ion exchange characteristics. These membranes are commercially available, and a typical example of a commercial sulfonated perfluorocarbon membrane is sold by E. I. Dupont de Nemours & Co., under the trade designation NAFION. A preferred cation polymer membrane (solid polymer electrolyte membrane) is one in which the polymer is a hydrated co-polymer of polytetrafluoroethylene (PTFE) and polysulfonyl fluoride vinyl ether ethylene and polysulfonyl fluoride vinyl ether containing pendant sulfonic ($SO_3$) acid groups. The sulfonic groups are chemically bound to the perfluorocarbon backbone, and the membrane is hydrated by soaking it in water, preferably at elevated temperatures for 10-60 minutes which yields a membrane having 30% to 40% water based upon dry weight of membrane.

As was noted herein above, the redox matrix 4 will include an "insulating/rectifying effective amount" of one or more of the aforementioned redox conductors. As used herein, an "insulating/rectifying effective amount" is an amount of the one or more redox conductors which is sufficient to provide the desired insulating and rectifying effect to any degree. Thus, quantity and type of redox conductors 8 included in the redox matrix 4 can be varied widely as desired depending on the current flow and the desired insulating and transporting voltage potential. In each case, the maximum amount of redox conductor in the matrix depends on the ion exchange capacity of the resin and the weight of the transition metal complex. In some cases in which the metal complex itself is polymerizable, i.e., $[(bpy)_2Ru(4,4'-divinylbipyridine)]^{3+/2+}$, the amount of redox conductor can be up to about 100 weight percent. In general, the quantity of redox conductor is at least about 5 weight percent based on the total weight of the matrix, and in the preferred embodiments is from about 5 to about 90 weight percent on the same basis. In particularly preferred embodiments, the quantity of redox conductor is from about 10 to about 50 weight percent, and in the most preferred embodiments is from about 10 to about 25 weight percent on the above-referenced basis.

The redox matrix for use in the invention can be conventionally prepared in accordance with conventional ion exchange techniques. Accordingly, these procedures will not be described herein in any great detail. Briefly stated, a suitable redox matrix as follows: A carbon felt electrode, with a cast polymer film of polystyrene sulfonate and polyvinylchloride with a monomer ratio of 1:7 is exposed for several hours to a dilute acid solution/containing the desired transition metal complex, i.e., 1M $H_2SO_4$ containing 5 mM $[(bpy)_3Ru]Cl_2$ for 18 hours at room temperature. As the incorporation of the redox conductor proceeds the films develops the color characteristic of the metal complex. For example, when $[(bpy)_3Ru]Cl_2$ is employed as the metal complex, the film turns orange. Alternatively, polymer film containing just the redox conducting transition metal site may be prepared from transition metal complexes containing polymerizable groups, as for example $[(bpy)_2Ru(4,4-divinylbipyridine)]^{3+/2+}$. These polymer films may be prepared directly on the electrode surface by electropolymerization by using conventional methods known to those skilled in the art.

The type of oxidation catalysts employed in the construction of the electrode of this invention are well known and not critical, to the practice of this invention. The type of catalyst employed can be varied widely as desired. For example, such useful catalyst include conventional catalyst used in catalytic sensing electrodes, for fuel cell electrodes, for chemical synthesis and processing electrodes, for gas generation electrodes and the like. One skilled in the art can choose any suitable catalyst material or materials depending upon the intended end use of the electrode of this invention. Many specific catalysts which can be used in the practice of this invention are described in U.S. Pat. Nos. 3,297,484 and 3,369,886 and included metals, metal oxides, metal alloys and other metal compounds, including mixtures of the foregoing selected from the group consisting of metals in Groups IV-B, V-B, VI-B, VII-B, VIII, I-B, II-B, III-B, IV-A and V-A of the Periodic Table of the Elements. Typical examples of the metals, metal oxides, metal alloys and other metal compounds which may be used in accordance with the present invention and mixtures of the foregoing, include the metals, metal oxides, metal alloys and other metal compounds of titanium, zirconium, vanadium, niobium, chromium, molybdenum, tungsten, manganese, rhenium, ruthenium, osmium, cobalt, rhodium, iridium, nickel, palladium, platinum, copper, silver, gold, zinc, cadmium, yttrium, tin, lead, and the like.

The catalyst can be affixed to a surface of the redox matrix in accordance with known techniques. For example, the process of U.S. Pat. No. 4,272,353 can be employed. In this process, before the catalyst is deposited upon the surface of the solid polymer electrolyte, the surface is treated by a suitable abrading or roughening means which contacts the surface of the solid polymer electrolyte base member in at least two directions. In a preferred mode, the solid polymer electrolyte membrane is abraded with a silicon carbide sheet to provide the desired roughness. The catalyst is deposited upon the roughened or abraded surface and fixed thereto by suitable means, e.g., pressure and/or heat. By this method, substantially reduced loadings of catalysts are possible.

U.S. Pat. No. 3,297,484 illustrates in detail materials for electrode structures including exemplary catalyst materials for electrodes, ion exchange resins for solid polymer electrolyte membranes and current collecting terminals. Catalytically active electrodes are prepared from finely-divided metal powders mixed with a binder, such as polytetrafluoroethylene resin, and the electrode comprises a bonded structure formed from a mixture of resin and metal bonded upon each of the two major surfaces of a solid polymer electrolyte solid matrix, sheet or membrane. In U.S. Pat. No. 3,297,484, the resin and metal and metal alloy powder mix is formed into an electrode structure by forming a film from an emulsion of the material, or alternatively the mixture of resin binder and metal or metal alloy powder is mixed dry and shaped, pressure and sintered into a sheet which can be shaped or cut to be used as the electrode. The resin and metal powder mix may also be calendered, pressed, cast or otherwise formed into a sheet, or fibrous cloth or mat may be impregnated and surface coated with the mixture of binder and metal or metal alloy powder.

In U.S. Pat. No. 3,134,697, many ways are described for incorporating catalytically active catalyst into the surfaces of an ion exchange resin membrane. In one embodiment, as explained above, the electrode material made of metal or metal alloy powder and a resin binder may be spread on the surface of an ion exchange membrane or on the press platens used to press the electrode material into the surface of the ion exchange membrane, and the assembly of the ion exchange membrane and the electrode or electrode materials is placed between the platens and subjected to sufficient pressure preferably at an elevated temperature sufficient to cause the resin in either the membrane or in admixture with the electrode material either to complete the polymerization if the resin is only partially polymerized, or to flow if the resin contains a thermoplastic binder.

The following specific example is present to more particularly illustrate the invention.

EXAMPLE

The matrix was prepared as follows. Polystyrene sulfonate, 0.1 g, was dissolved in 20 ml of dimethylsulfoxide. Polyvinyl chloride, 0.01 g, was added to the solution in the form of a 3% dimethyl formamide solution. This mixture is then casted on the desired supporting electrode as a thin film. Three layers were cast with a 10 minute air cure at room temperature between each casting. The three layers were subjected to a final cure at 115° C. for 12 hours. A slurry composed of an identical solution, of polystyrene sulfonate and polyvinyl chloride and <2 micron size ruthenium dioxide particles, Engelhard #11,352-45 size, was used to cast films of the oxidation catalyst layer. Two layers were applied last. The layers was allowed to air cure for 10 minutes at room temperature. To activate the matrix, the electrode/matrix/oxidation catalyst combination was soaked overnight in a 0.2M $Na_2SO_4$ aqueous solution that also contained $5\mu M$ of $[Ru(bpy)_3]Cl_2$.

Stability testing/protective rectification was performed by potentiostating the electrode assembly at $-0.8$ V vs NHE seven days and comparing cyclic voltammograms of cast films with and without the intervening protective matrix. The protected electrode displayed less decomposition at comparable current voltage curves than the ruthenium dioxide electrode alone.

What is claimed is:

1. An improved electrical device of the type which includes a material which is susceptible to decomposition when subjected to fluctuations in redox potential, said material being attached to a surface; the improvement which comprises a redox matrix comprising a polymeric matrix containing an insulating and rectifying amount of a dispersed redox conductor, said redox matrix being positioned between said material and the source of said redox potential and said redox matrix allowing the flow of electrical current to said material only at selected redox potentials.

2. An improved electrical device of the type which includes a material which is susceptible to decomposition when subjected to fluctuation in redox potential, said material being attached to a surface; the improvement comprising a redox matrix which comprises a polymeric matrix containing an insulating and rectifying amount of a dispersed redox conductor selected from the group consisting of complexes of metals of the first, second and third rows of the Periodic Table, said redox matrix being positioned between said material and the source of said redox potential and said redox matrix allowing the flow of electrical current to said material only at selected redox potentials.

3. A device according to claim 2 wherein said redox conductor is dispersed in said matrix in a substantially uniform manner.

4. A device according to claim 2 wherein said redox conductors are complexes of iron, ruthenium or osmium.

5. A device according to claim 2 wherein the self exchange rate constant of said redox conductor is at least about $20M^{-1}S^{-1}$.

6. A device according to claim 5 wherein said self exchange rate constant is at least about $10^3 M^{-1}S^{-1}$.

7. A device according to claim 6 wherein said self exchange rate constant is at least about $10^6 M^{-1}S^{-1}$.

8. A device according to claim 7 wherein said self exchange rate constant is at least about $10^9 M^{-1}S^{-1}$.

9. A device according to claim 5 wherein said redox conductors are bis-(bipyridyl) complexes of iron, ruthenium or osmium.

10. A device according to claim 5 wherein said redox conductors are complexes of ruthenium.

11. A device according to claim 2 wherein the quantity of redox conductor in said matrix is at least about 5 weight percent based on the total weight of the matrix.

12. A device according to claim 11 wherein said quantity is from about 5 to about 95 weight percent.

13. A device according to claim 12 wherein said quantity is from about 10 to about 50 weight percent.

14. A device according to claim 13 wherein said quantity is from about 10 to about 25 weight percent.

15. A device according to claim 2 which is a catalytic electrode.

16. An improved bifunctional air electrode for use in electrochemical energy cells comprising a hydrophobic gas permeable layer on the air side of said electrode: and a hydrophilic layer containing a catalyst for oxygen reduction, the improvement comprising a redox matrix pressed to said hydrophilic layer containing an insulating and rectifying amount of a dispersed redox conductor.

17. An improved bifunctional air electrode for use in electrochemical energy cells of the type comprising a hydrophobic gas permeable layer on the air side of said electrode, and a hydrophilic layer containing a catalyst for oxygen reduction, the improvement comprising a redox matrix pressed to said hydrophilic layer containing an insulating and rectifying amount of a dispersed redox conductor selected from the group consisting of complexes of metals of the first, second and third rows of the Periodic Table.

* * * * *